United States Patent [19]

Seko et al.

[11] 3,953,568
[45] Apr. 27, 1976

[54] METHOD OF SIMULTANEOUS CONCENTRATION AND DILUTION OF ISOTOPES

[76] Inventors: Maomi Seko, 6-5, 2-chome, Ookayama, Meguro, Tokyo; Hidetake Kakihana, 2-24, 3-chome, Zaimokuza, Kamakura, Kanagawa, both of Japan

[22] Filed: July 17, 1972

[21] Appl. No.: 272,250

[30] Foreign Application Priority Data

July 22, 1971 Japan................................ 46-54210
Sept. 28, 1971 Japan................................ 46-75072
June 13, 1972 Japan................................ 47-58221
June 12, 1972 Japan................................ 47-57636

[52] U.S. Cl......................................... 423/7; 423/2; 423/139; 423/157; 423/181; 423/276; 423/351; 423/414
[51] Int. Cl....................... C01g 43/00; C01g 53/00; C01g 57/00
[58] Field of Search................ 423/2, 6, 7, 139, 181, 423/298, 351, 414, 276, 157; 252/301.1 R; 210/31 C

[56] References Cited
UNITED STATES PATENTS

| | | | |
|---|---|---|---|
| 3,511,620 | 5/1970 | Shimokawa et al................... | 23/338 |
| 3,522,172 | 7/1970 | Pretorius et al................... | 210/31 C |

OTHER PUBLICATIONS

Grant, "Hackh's Chemical Dictionary," 4th Ed., p. 156, McGraw-Hill Book Company (1969) New York.
Spedding, "Macro Separation of Stable Isotopes on Ion–Exchange Columns," Journal de Chimie Physique, Vol. 60, pp. 89–96, 1963.
Kakihana et al, "Ion–Exchange Separation of Isotopes," Nuc. Sci. Abst., Vol. 17, No. 4, Abst. No. 23839, 1963.
Kakihana, "Ion–Exchange Separation of Lithium, Nitrogen, and Uranium Isotopes," J. de Chimie Physique, Vol. 60, pp. 81–88, 1963.
Glueckauf, "Separation of Isotopes By ... Ion–Exchange Chromatography," J. de Chimie Phys., Vol. 60, pp. 73–80, 1963.
Perret et al., "... Processes Involving the Isotopes of Lithium" Proc. 2nd U.N. Int'l. Conf. on Peaceful Uses of Atomic Energy, Vol. 4, pp. 598–599, 1958.
Forberg et al., "Enrichment of Heavy Sulfur Isotopes with an Anion Exchanger," Proc. Int'l. Smyp. on Isotope Separation, pp. 243–246, 1958.

*Primary Examiner*—Benjamin R. Padgett
*Assistant Examiner*—E. A. Miller
*Attorney, Agent, or Firm*—Burgess, Dinklage & Sprung

[57] ABSTRACT

A method of simultaneously obtaining separate enriched fractions of heavier and lighter isotopes from mixtures thereof with the use of an ion exchange resin column by passing a ligand body containing this isotope mixture through the column. The isotopes, as they are passed through the column, are present in the forms of ligand-containing coordination compounds having different valence states and are followed by an eluant and form a band which travels through the column, the front and rear portions of which are respectively enriched in one of the isotopes and depleted in the other.

18 Claims, No Drawings

METHOD OF SIMULTANEOUS CONCENTRATION AND DILUTION OF ISOTOPES

This invention relates to the separation of isotopes by scission and/or formation of coordination bonds between isotopes and ligands in the presence of an ion exchange resin, and advancing bands of said isotope ions and an eluant in the direction of the flow of the eluant.

It is known from the literature that isotopes of some elements of light mass having isotope mass ratio considerably more or less than 1 have been separated using ion exchange resins. The principle of such separation of lithium 6 and lithium 7, boron 10 and boron 11 or nitrogen 14 and nitrogen 15, for example, is based on the different affinity between the isotopes and the ion exchange resin due to the difference of water solvation and dissociation of ions comprising isotopes. However, an element having an isotope mass ratio close to unity, such as uranium (uranium 235 and uranium 238) cannot effectively be separated by chemical means. A research report of Dr. F. H. Spedding and Dr. J. E. Powell, entitled "Separation of Isotopes on Ion Exchange Columns," in U.S. A.E.C. Report ISC-475 (1954, declassified 1958), discusses separation of uranium isotopes using U(VI) salts and ion exchange resins. Then the U.S. Atomic Energy Commission and its laboratories have extensively researched the chemical separation of uranium isotopes but it was finally concluded that the chemical separation of uranium 235 by ion exchange chromatography is impossible. Thus, A. C. Rutenberg and J. S. Drury state in the Journal of Inorg. Nucl. Chem. 1969, Vol. 31, Page 2289, that "In summary, it must be concluded on experimental as well as theoretical grounds that the fractionation of U isotopes by chemical techniques is economically and technically unfeasible. The enrichment of Uranium 235 is thus a task best left to other isotope separation techniques."

Notwithstanding these negative statements it is an object of the present invention to provide a chemical technique for the fractionation of isotopes of an element.

It is a further object of the invention to provide a technique for changing the distribution of isotopes in a medium using ion exchange resins.

These and other objects are realized in accordance with the present invention pursuant to which there is provided a method of simultaneously producing a fraction enriched in and a fraction depleted in a particular isotope of an isotope mixture which comprises passing a predetermined amount of solution containing ions of a mixture of isotopes through a column of an ion exchange resin in the presence of ligands, the solution forming a band of isotopes in said column, passing a solution of an eluant through said column, whereby coordination bonds between isotopes and ligands break and/or form, and said band of isotopes advances through said column, and collecting the effluent from said column when said band reaches the end thereof, the effluent being collected in at least two fractions one of which is concentrated in a particular isotope and the other of which is diluted in said isotope.

The simultaneous concentration and dilution of isotopes according to this invention means that a specific isotope of the element is concentrated in a specific portion of the band of the ion exchange resin, e.g., in the frontal portion of the band, and is diluted in the opposite portion, e.g., in the rear portion of the band; simultaneously another isotope of the same element is diluted where the first isotope was concentrated, and vice versa. There may of course be more than two isotopes.

"Coordination bond" as employed herein is a bond in which a metal ion has vacant orbitals and accepts electrons from a ligand, i.e. a complex bond. A "coordination reaction" is one in which solvent molecules solvated on a metal are replaced by other radicals - ligand - in aqueous solution. The coordination of metals is shown in the general formula as follows:

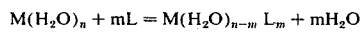

wherein
M is a metal,
L is a ligand, and
m and n are integers.

The isotope effect as employed herein is the difference in reactivity for formation of a coordination bond. In other words, isotope effect is defined as the difference in affinity of isotope for ligand depending upon the atomic weight of isotopes.

Isotopes of this invention can be applied to any kind of metal coordination compound, and element in the ligand as well. Therefore, by this invention it is possible to concentrate any isotope of a metal and/or a non-metallic ligand element. It is well known that isotopes have the same chemical characteristics and their separation is very difficult, so that industrial separation has been performed mainly by physical means. Since uranium has a large atomic weight the mass ratio of isotopes $^{235}U/^{238}U$ is close to unity so that physical methods such as gas diffusion or centrifugation have been tested or operated industrially. When an isotope has a relatively small molecular weight such as deuterium and boron, the isotope mass ratio is considerably more or less than 1, and chemical separtion methods such as absorption or distillation may be utilized for separation. However, the separation factor per unit stage is quite small so that efficient separation is difficult. Isotopes in this invention can be applied to any metal and/or ligand of a coordination compound. Any metal or non-metal element contained in a ligand can be concentrated and/or diluted by the method of this invention.

Scission and/or formation of the coordination bond in this invention are shown by the following general equation (1). The essence of this invention consists in that the isotope of metal ion or non-metal ion comprised in a ligand can be concentrated and/or diluted by using the reaction described by the following general formula:

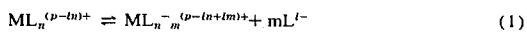

wherein
M is metal,
$ML_n$ is a coordination compound,
L is ligand,
P and l are the valence of metal and ligand, and
m and n are integers,
and isotopes are contained at least in either metal or ligand. By scission and/or formation of the coordination bonds in the presence of ion exchange resin, and advancing a band of the isotopic mixture of ions on the ion exchange resin in the direction of the flow of eluant separation is achieved.

In this case, the ion exchange resin serves to effect the scission and/or formation of the coordination bond of the coordination compound. Also, it serves as a medium for the advance of bands of isotope ion and eluant. Simultaneously the ion exchange resin serves to superimpose the effect of separation of isotopes caused by scission and/or formation of the coordination bond, by repeating the adsorption and elution of said coordination compound.

The isotope ions on the ion exchange resin are in equilibrium with the external solution, and advance as bands in the direction of flow of eluant. The separation of the isotopes is illustrated with reference to two isotopes of the same element in the presence of a cation exchange resin, as follows:

Suppose that A, B are isotopes and X is a ligand. A, B and X are to form, stepwise, several coordination compounds up to $AX_n$, $BX_n$, both in liquid phase and ion exchange phase.

(2)

Isotopes A and B have different reactivities with ligand X. Consequently their coordination compounds have different stability constants. Assuming that A and B are a metal element, the isotope B of heavier mass has a stronger tendency to react with X than A of lighter mass. Therefore in the external liquid phase, B reacts with X more strongly than A, which results in making the average valence of B complex lower than that of A complex. Since, in general, the cation exchange resin adsorbs higher valent ions preferentially, A ions are selectively adsorbed on the resin phase. Thus, the coordination bond of the A ion is broken in the liquid phase to keep the equilibrium, and A ion is adsorbed more selectively onto the ion exchange resin. On the other hand, isotope B has a larger mass and reacts more strongly with ligand X and A in the external liquid phase, and exists essentially in the form of lower valence coordination compound ions in the liquid phase. Therefore, isotope ion B will flow downward along the ion exchange resin column with eluant and will be adsorbed in the lower part of column. Consequently lighter isotope ion A is adsorbed in the rear part of band of ion exchange resin, while heavier isotope B is adsorbed in the frontal part of the band on the ion exchange resin. These bands advance in the direction of eluant flow by repeated adsorption and elution during the advance.

Of course, the above explanation is based on the general rule that a cation exchange resin adsorbs higher valent ions more selectively than lower valent ions. However, this general rule does not hold in special cases. For example, when the concentration of eluant in the external liquid phase is high, the ion exchange resin sometimes adsorbs lower valent ions more selectively than higher valent ions: thus, sometimes the isotope enriched portion of the band is opposite what would be expected from the general rule. liters/hour In the above explanation, the ion exchange resin has been assumed to be cation exchange resin, and the isotope ion has been assumed to be a metal cation. When the isotope is an anion and the ion exchange resin is an anion exchange resin, or in case the selectivity of the ion exchange resin is opposite what would be expected from the general rule, the locations where the heavier isotope and the lighter isotope are concentrated are reversed.

As is clear from the above explanation, scission and/or formation of coordination bonds between isotopes and ligands occurs at least in one of the liquid phase and the ion exchange resin phase. As the isotope effect of scission and formation of coordination bonds are opposite, it is important to select the ion exchange resin, eluant, concentration, and isotope ion in the system to maximize the overall isotope effect in the system by super-imposition of individual isotope effects in both the liquid and ion exchange resin phases, which selections can be made only by those skilled in the art who are familiar with the foregoing principles.

Especially a favorable super-imposition of individual isotope effects in both liquid and ion exchange resin phases is realized using an anion exchange resin, and the ion of the metal isotope exists as a cation of the coordination compound with ligands in the external liquid phase, and the anion exchange resin is coordinated with said isotope ions directly. This is one of the highest cases of isotope separation in the application. Scission and/or formation of coordination bonds are generally competing for the isotope separation and they occur separately either in liquid phase or ion exchange phase. Examples of isotope concentration include (1) the cation of a metal isotope species undergoing scission in the external liquid phase in the presence of cation exchange resin, or (2) the formation of a coordination bond of metal ion or metal-containing ion in the presence of an anion exchange resin.

The explanation of equation (2) hereinabove referred to X as a ligand, but, oxidation and reduction systems can be explained in the same way considering X as an electron. Therefore, this invention can apply to isotope separation by the electron exchange reaction of isotopes, in which removal and/or addition of the electron to the isotopes is conducted in the presence of an ion exchange resin, by advancing mixture of ions containing isotopes along an ion exchange resin columns in the direction of flow of eluant. In this case, an electrolyte solution of the same element of different valence is utilized as the eluant. For example, an oxidation reduction reaction of uranium is shown in the following equation:

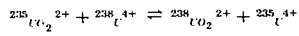

By this reaction, uranium 235 is concentrated in the band of the U(IV) ion by scission of the bond between U(IV) and oxygen, the U(IV) ion band advancing in the direction of flow of eluant.

Experiments have been proposed and carried out involving the "breakthrough method," wherein an isotope mixture flows through a column of ion exchange resin, and the frontal part of the effluent is collected in several fractions and analyzed to obtain the percentage of concentration or dilution of isotopes. However, in such experiments, concentration and dilution of isotopes cannot be detected simultaneously in the same band in contrast with the present invention wherein simultaneous concentration and dilution occurs in the same band of the isotopes.

As shown previously, the separation of uranium isotopes was impossible using the uranyl ion. However, it has been found that uranium isotopes can be separated efficiently when a U(IV) compound is utilized as the starting material. U(VI) compound ions do not function similarly.

As a typical application of this invention, for instance, a reaction between metal isotopes and ligand is shown in the following equations (3) and (4). (3) shows a typical example involving a cation exchange resin.

$$ALn^{(p-ln)+} + (p - ln + lm)/q.RqC \rightleftharpoons (p - ln + lm)/q.C^{q+} + mL^{l-} + R_{p-ln+lm}AL_{n-m} \quad (3)$$

wherein
A is a metal isotope,
L is a ligand,
R is an ion exchange resin,
C is a cation,
p, q and l are the respective valences of A, C and L, and n and m are integers Equation (4) shows a typical example involving an anion exchange resin:

$$A^p + (p-mg(/1.L^{l-} + mX^{q-} + nR_lL \rightleftharpoons R_{nl}AL_{q\cdot} \quad (4)$$

wherein
X is an anion of valence q, and A,L,R,p,l,m and n are the same notations as in equation (3).

By these reactions of isotopes in the external liquid and resin phases, isotopes can be separated in the presence of ion exchange resin, the band of ions of the isotope mixture advancing in the direction of flow of the eluant.

By scission and/or formation of coordination bonds, ions having a stronger affinity for the ion exchange resin are concentrated in the rear part of the band on the ion exchange resin, the ions having a lesser affinity, being concentrated in the frontal part of each band. As the ion exchange resin has a higher selectively for higher valent ions, ions having smaller stability constants have higher selectivity for cation exchange resins. With anion exchange resins the situation is opposite. Thus, the lighter isotope is concentrated in the rear part of each band on a cation exchange column and in the frontal part of each band in an anion exchange resin. Heavier isotopes behave oppositely. Dilution of each isotope occurs on the opposite side of the band where concentration of the same isotope takes place. In spite of the above general rule, when the concentration of eluant is high, e.g., more than about 1 mole per liter, some ion exchange resins adsorb smaller valent ions more selectively. For example, it is known that the selectively of ion exchange resins is reversed if the ion exchange resin is immersed in a concentrated solution of electrolyte. In such event, concentration will occur at a location opposite that stated above. For example, in a concentrated solution of hydrochloric acid, U(IV) compounds form complex ions, and uranium 238 is concentrated in the frontal part of each band on the anion exchange resin while uranium 235 is concentrated in the rear part of the same band.

In accordance with the invention monovalent isotopes can be treated provided the coordination bond of the metal ion undergoes scission and/or formation. On the contrary, the invention does not extend to isotope ions which are dissociated or hyddrolyzed in the aqueous phase, such isotope ions entering the ion exchange resin having different affinity therefor. Thus, it does not extend to ammonium and sodium due to the fact that these do not undergo scission and/or formation of a coordination bond between metal and ligand.

The ligand is an electron donor to a metal ion, an atom or group containing oxygen or nitrogen. The invention can be applied to all electron exchange reactions, i.e. the reaction system of oxidation reduction of multivalent metal ions. Generally such reduction oxidation system is shown in the following general equation:

$$A^{n+} + BO_p{}^m \rightleftharpoons AO_p{}^{m+} + B^{n+}$$

wherein
A and B are isotopes,
n and m are the valences of A and $BO_p$, respectively,
and p is an integer.

In order to conduct a successful separation of isotopes by scission and/or formation of the coordination bond of the coordination compound, it is desirable that the state of the coordination bonds of the isotope ions in the external liquid phase is different from that of the isotope ions in the ion exchange resin phase. For example, the following are preferable conditions for separation of isotopes: (1) despite the fact that the average valence of the isotope stays as lower valent coordination is low or nearly zero in the liquid phase, the isotope ions preferably have an ionic bond in the ion exchange resin phase, or (2) the case in which isotope ions are essentially in the state of anions or cations in the liquid phase, the isotopes are conversely cations or anions in the resin phase. In these cases when the isotope ion travels between the resin phase and external liquid phase by adsorption and elution, it is easy to have a high separation factor of isotopes by scission and/or formation of the coordination bond between the isotope ions and ligand.

From this point of view, a preferred example is the case in which an anion exchange resin is converted to the form of ligand that is preferably coordinated with metal isotopes and, in the external liquid phase, the metal isotope ions exist in the form of cations, with or without coordination bond with the ligand. In order to realize this condition, it is important to decrease the concentration of external solution, or to prevent metal ions from forming coordination compounds in the external liquid phase, or to elute by using an eluant which does not form a coordination bond in the liquid phase. For this purpose, the anion exchange resin is exchanged by an anion which tends to coordinate with the metal isotope ions, further metal ions are adsorbed. For this purpose, after elution, the ion exchange resin is separately regenerated into the type of a ligand and, further, preferably eluted by an eluant, which does not coordinate with isotope ions.

In order to apply this principle for uranium separation, it is preferable to convert an anion exchange resin to one of organic acid or inorganic acid type which easily coordinates with uranium, then the uranium isotope mixture is supplied to the ion exchange column, and thereafter the column is eluted with an eluant such as hydrochloric acid which does not coordinate with uranium. In such application, although it is necessary to repeat regeneration, adsorption and elution of ion exchange column, the degree of isotope concentration is considerably high.

Isotope separation is carried out by advancing alternating bands of isotope mixture and of another kind of ion along the ion exchange resin column in the direction of flow of eluant. In case more than two pairs of alternating bands of isotope ions and eluant advance along the ion exchange column, not only will the unit production capacity of the column be increased but also the eluant will be utilized to elute a plurality of isotope bands, so that the consumption of eluant per unit production of isotopes can be reduced. In order to form an isotopic mixture of ions as a band on the ion exchange column, the isotope mixture solution is supplied in predetermined amount to form a band of the desired width. When a plurality of isotope bands are formed along a single ion exchange column, the supply of eluant is interrupted periodically and additional isotope mixture solution is supplied to the column.

The isotope mixture supplied to the ion exchange column is generally a solution of a compound containing isotope ions. The isotope compound can be in any form of isotope so long as it is soluble in water and/or other solvents. When the isotope compound is of limited solubility in water, it is sometimes preferable to mix an organic solvent or another kind of electrolyte solution into the eluant in order to increase the solubility of the isotopes. The isotope compound may be an acid, base, salt and/or coordination compound, and sometimes a compound combined with ligand in a solvent or electrolyte solution. Especially if the isotope compound has a strong coordination bond and scission of the coordination bond between isotope and ligand is conducted in the presence of ion exchange resin, a high isotope effect is obtained. If the solution of the isotope compound supplied to the column does not contain any ligand, it is essential to use an eluant containing ligand.

As a typical example of coordination compound of this invention, any metal element and/or non-metal element contained in the ligand can be utilized. The isotope compounds should be soluble in water, electrolyte solution and/or other solvents, and have a group to be exchanged with the ion exchange resin; the isotope ion may be any chemical form of ionic bond or any form of coordination bond with other elements.

Isotope compounds of this invention may be organic or inorganic salts, acids, base dissociable coordination compounds, complex salts, etc. Isotope contained in the ligand may be oxygen, nitrogen, sulfur, fluorine or their radicals. As the compounds of metal isotopes, metal salts with eluant anions are most preferable.

This invention can be applied preferably to the following elements: metals such as uranium 235 and uranium 238, lithium 6 and lithium 7 which are coordinated with ligands, boron 10 and boron 11 which is coordinated with ligands, non-metal elements contained in ligand including nitrogen 14 and nitrogen 15, carbon 12 and carbon 13, sulfur 32 and sulfur 34, oxygen 16 and oxygen 18, and other natural or artificial isotopes.

For example, uranium isotopes may be separated from organic and/or inorganic U(IV) compounds, boron isotopes may be separated from boric acid and boric acid salt coordination compounds, carbon isotopes may be separated from cyano compounds, oxygen isotopes may be separated from water or acid, and sulfur isotopes may be separated from sulfur oxides and/or acids.

The concentration of the isotope solution supplied is such as will not result in precipitation of the coordination compound either in the ion exchange resin phase or the external liquid phase, e.g., it is preferable to use about $10^{-4}$ to 10 mole/l, most preferably about 1 to $10^{-3}$ mole/l.

Also, the pH of the isotope solution is such that precipitation does not occur. Especially in case isotope ions are utilized together with organic compounds, it is possible to choose specific organic compounds which do not precipitate over a wide range of pH.

In case a plurality of bands exist along the column, it is preferable that each band be about 2 to 1,000 cm wide. Regardless of the quantity of isotope ions supplied to form a single band, the width of the band is influenced by the characteristics of the ion exchange resin, the exchange velocity of the ion exchange resin, the concentration of isotopes in liquid phase, the coordination stage of the ligand, the temperature, the concentration of eluant, the selectivity of the resin, etc. When the width of the band expands during advance, the production rate of isotope per unit volume of resin decreases. Therefore, it is important to minimize the diffusion of the isotope bands along the ion exchange resin column, preferably within from about 10 to 200 cm, in case a plurality of bands are eluted by a common eluant.

The isotopes adsorbed on the ion exchange resin advance in the form of a dissociated ion or coordinated ion with an ion exchange group, ligand type ion exchange group, or with metal adsorbed ion exchange resin.

Generally, isotope metal elements and metalcontaining atomic groups are cationic and are adsorbed by cation exchange resins. However, these metallic groups sometimes react with a plurality of anions of ligand or a eluant to form and anion which is adsorbed by an anion exchange resin. For example, multivalent metal ion, e.g., U(IV) ion, may be cationic or anionic according to the following equation:

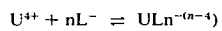

The eluant advances bands of isotopes in the direction of flow. During this advance cationic or anionic isotope compound ion is eluted from the ion exchange resin, and then the isotope ions are again adsorbed on the adjacent groups of ion exchange resin. These operations are repeated during the whole process of advance. Therefore, the composition and concentration of eluant are selected in order that isotope ions are not only eluted from the ion exchange resin but also adsorbed from the external liquid phase by the ion exchange resin while maintaining the equilibrium between ion exchange resin and external liquid phase.

As noted, the eluant may be an organic or inorganic salt, acid, base, and/or electrolyte solution provided it is soluble in water or other solvents and is dissociable to form an electrolyte solution. If the isotope compound in the starting material does not contain any ligand, the eluant must contain ligand which is an electron donor atom or atomic group. In this case, the eluant is an electron donor dissociable in aqueous solution, and due to dissociation, it has counter-ion L. If the initial isotope compound contains a ligand and the ion exchange group contains a ligand, the eluant need not include a ligand.

It is preferable that the eluant has an isotope effect either in the ion exchange phase or the external liquid phase. The desired isotope effect results from the different affinity which the isotopes have for the eluant depending upon the atomic weights of the isotopes. In order to have a sufficient isotope effect, those isotope ions are preferred which form coordination compounds with the eluant.

In case a cation exchange resin is used, isotope ion A forms the complex compound $AL_n^{(p-in)+}$ by the reaction with L. Therefore the eluant is preferably a compound to reduce the positive valence of the isotopes. In case an anion exchange resin is utilized, the eluant preferably increases the absolute negative value of the valence of the isotopes.

The eluant generally is water, an acid, or base, e.g. a mineral or organic acid or their salts, an electrolyte mixture of acid and salt, a base, an electrolyte mixture of base and salt, or a solution of an organic or inorganic compound which easily coordinates with metal such as halogen, nitrogen, oxygen and sulfur.

Typical examples of these compounds are:
1. Water.
2. Inorganic acids such as sulfuric acid, hydrochloric acid, hydrobromic acid, phosphoric acid, carbonic acid, perchloric acid, sulfurous acid, and the like.
3. An ammonium, alkali metal or alkaline earth metal salt of the above inorganic acids.
4. Mixtures of salt (3) and inorganic acid (2).
5. a. Saturated aliphatic acid such as formic acid, butyric acid, propionic acid, and the like, and/or substituted aliphatic acids such as chloroacetic acid, bromoacetic acid, glycolic acid, glyoxylic acid, cyanoacetic acid, chloropropionic acid, and the like.
  b. Aromatic acids and substituted aromatic acids such as benzoic acid, naphthoic acid, phenylacetic acid, toluic acid, salicylic acid, and the like.
  c. Polybasic acids such as oxalic acid, malonic acid, succinic acid, adipic acid, fumaric acid, tartaric acid, citric acid, and the like, and/or polybasic acids substituted by hydroxyl, aldehyde, keto or halogen.
  d. Unsaturated organic acids and their substitution products such as acrylic acid, methacrylic acid, crontonic acid and the like.
6. Any ammonium, alkali metal or alkaline earth metal salt of the above organic acids.
7. Bases such as sodium hydroxide, potassium hydroxide, ammonia, primary amine, secondary amine, tertiary amine, quaternary ammonium compounds, and their salts.
8. Organic compounds containing sulfur, oxygen and/or nitrogen atoms.
9. Chelating agents such as ethylenediaminetetraacetic acid, quinoline, nitrilo-triacetate, and the like, and their salts.
10. Organic or inorganic compounds which dissociate in water and/or solvents, such as fluoride, oxyfluoride, coordination compounds containing a fluorine atom, any inorganic fluorine derivative such as fluoroboric acid or its metal salts, any organic fluorine compound such as alkylammoniumfluoroborate, and the like.
11. Cyano compounds that dissociate in water and/or solvent, such as cyanide and its double salt, cyanamide, cyanate, thiocyanate, and the like.
12. Polyelectrolytes which form coordination compounds in the liquid phase, such as polymeric acids, e.g. polystyrene sulfonic acid, polyacrylic acid, copolymers of acrylic acid and styrene sulfonic acid, copolymers of styrene sulfonic acid or acrylic acid and vinyl alcohol, and the like.
13. Electrolytes different from the isotope ions on the ion exchanger.
14. Isotope compounds of different valence.

As a special eluant applicable only for oxidation and reduction systems, U(VI) compounds can be utilized provided they are soluble in water and/or organic solvent and may be in the form of salt, mixture with salts and acid, or an electrolyte solution. As uranium 235 advances in the band of the U(IV) compound ion from the band of U(VI) compound ion due to an electron exchange reaction, there is no concentration of uranium 235 in the band of the U(VI) compound ion. In this respect, the U(VI) compound acts only as an eluant in the oxidation reduction system of this invention. Similarly, with the electron exchange reaction using different valences of other metals, when the isotope is concentrated in the band of lower valence, the eluant may comprise a metal compound of higher valence. Similarly, in obtaining an isotope of heavier mass, an eluant comprising a metal compound of lower mass may be utilized.

A solvent containing a nitrogen, oxygen, sulfur atom or atomic group may react with an isotope compound by coordination and it is sometimes preferable to utilize solvents, such as carbitol, tributyl phosphate, trioctylamine, diethyl ether, alcohols, amines and ethers.

The concentration of eluant is such that precipitation does not occur in either the ion exchange resin or external liquid phase. Generally the concentration is about 10 to 0.005 moles/liter.

The velocity of eluant may be varied widely but should be greater than the velocity of advance of the band along the ion exchange resin.

The migration velocity or velocity of advance of the isotope bands is influenced by the flow velocity of eluant and is preferably selected in a range of from 0.1 to 1,000 cm/hour.

The temperature during the process may vary widely, e.g. about 0° to 100°C or the boiling point of the eluant. It is determined by considering various factors, e.g. stability of ion exchange resin, etc. Generally, the higher the temperature of eluant, the higher the velocity of advance of the band; the higher the velocity of advance, the less the mixing of isotopes.

Generally speaking, different from conventional ion exchange operation, isotope separation is seriously influenced by the exchange velocity of ions between resin phase and external liquid phase. It is especially essential to prevent mixing of isotope ions in the region of concentration in the band in order to maximize the concentration of the desired isotope. However, when the percentage of cross-linking of the ion exchange resin is increased in order to have a higher isotope separation with an ordinary ion exchange resin, it is inevitable to have some mixing of separated isotopes on the ion exchange resin, because of the considerably low exchange velocity of conventional resins. This may be due to relatively slow diffusion velocity of isotope ions to penetrate in or to come out of the core of the resin particle.

Therefore, it is preferable to operate at a temperature of about 30° to 90°C for good separation of isotopes. Mixing of isotopes is more serious in case concentration occurs in the rear part of the band rather than in the frontal part of the band. Also, the exchange velocity between ligand and metal ions in the external liquid phase is not rapid enough; especially if an organic ligand is utilized the exchange velocity of ligand is usually slow, and it is necessary to increase the operating temperature in order to provide sufficient velocity for ligand exchange reaction on the ion exchange resin or to provide a high enough rate of scission and/or formation of the bond.

The solution of isotope ion and eluant are supplied adjacent the end of the column. Eluant flows generally downwardly along the column, but sometimes upwardly from the bottom. In case the ion exchange column is installed horizontally, both the isotope solution and the eluant flow horizontally, and the isotope bands advance horizontally. Effluent of eluant is obtained from the opposite side of influent.

The simultaneous concentration and dilution of isotopes is carried out in the frontal part or rear part of the band. In the middle part of the band the isotope ratio is approximately the same as that of the initial material, but the width of the middle part of the band decreases with the advance distance and the widths of both the frontal part and the rear part of the band increases as isotope separation proceeds.

The higher separation factor per unit stage, the longer the column and the higher the concentration gradient of the end part of the band, the higher is the percentage of separation.

The ion exchange resin is the medium for advance of the isotope ions as well as the medium for separation. Therefore, another function of the ion exchange resin is to adsorb isotope ions of higher valence selectively and concentrate each isotope species in different locations of the band due to the difference in reactivity between isotope and ligand. The ion exchange resin also fractionates the isotope ions depending on the difference in trends of the coordination bond during elution and results in super-imposition of the isotope effect. From this point of view, any ion exchange resin having selectivity for ions of different valence can be utilized for this invention. However, in order to carry out effective concentration of isotopes without mixing, it is important to have a higher velocity for the exchange reaction between ion exchange resin and external liquid phase. In this respect, conventional ion exchange resins such as Amberlite or Dowex are not feasible in preventing isotope mixing so they are not suitable to be utilized for isotope separation. It is preferable instead to use an ion exchange resin of porous structure and high crosslinking in practicing the invention.

Various methods for the preparation of porous exchange resin have been proposed for the prompt adsorption and regeneration of ions.

The suitable ion exchange resin for the concentration of isotopes can be selected from the above kind of ion exchange resins. Porosity of the resin is expressed in this invention by the apparent density i.e., the weight (gram) of dry resin per unit volume (cc) of wet resin. This apparent density is measured by using Na-type resin as to cation exchange resins and by Cl-type resin as to anion exchange resins. The porosity of the resin increased with decrease of the apparent density. In order to have effective concentration of isotopes of this invention, particularly, the apparent density of cation exchange resins, for example, sulfonic acid type cation exchange resin, is preferably less than 0.400; the apparent density of anion exchange resin, for example, type-I anion exchange resin which is the crosslinked polystyrene chloromethylated and then aminated with trialkylamine such as trimethylamine is preferably less than 0.340; the apparent density of anion exchange resin, for example, type-II anion is preferably less than 0.400; the apparent density of cation exchange resin of carboxylic acid type is preferably less than 0.340.

In order to conduct effective separation of isotopes of this invention, it is very important to prevent the isotopes separated on the band from mixing due to the slow absorption or elution between the resin phase and the liquid phase. For this purpose, the mesh (or diameter) of ion exchange resin is preferably 5 to 500 mesh (4 to 0.03mm in diameter). The preferable mesh or diameters are selected in accordance with the porosity, the percentage of crosslinkage of the resin and operation temperature of isotope separation. Most preferable mesh of the resin in this invention is 50 to 200 mesh (0.29 to 0.04 mm in diameter).

The exchange capacity of the ion exchange resin, percentage of crosslinking and composition of resin are selected in order to realize the maximum concentration effect of isotopes. The exchange capacity of the ion exchange resin is preferably about 1 to 10 milli-equivalents per gram of dry resin in the homogeneous part of the ion exchange resin. It is important to consider the distribution of the ion exchange groups in the ion exchange resin in order to prevent the mixing of isotopes in the resin. In other words, unlike conventional resins, if the ion exchange groups are limited to the surface of the resin, the velocity of the exchange reaction is improved and mixing of isotopes will be prevented. However, if the exchange groups are contained in the centers of the ion exchange resin particles, it often takes time to exchange those ions in the central parts of the resin particles and this causes mixing of isotopes. To this end, the ion exchange groups are preferably no more than about 0.02 to 0.15 mm deep; the depth should be no more than about 90 percent of the radius, e.g. about 10 to 90 percent. This can be accomplished by providing the ion exchange groups on the surface of spherical polymeric bodies of inorganic material such as glass or organic material such as Teflon polyfluorocarbon to the desired thickness. Base polymers for the ion exchange resin sometimes are reacted to provide the desired depth of sulfonic acid or amine groups on the surface of the ion exchange resin. These ion exchange resins having exchange groups only on the surface result in superior isotope concentration without sacrificing the total exchange capacity per unit volume of the ion exchange resin column, because the volume occupied by the center core which is free of ion exchange groups is rather limited in comparison with the total volume of the ion exchange resin. The exchange capacities mentioned above are exhibited by the surface layer of such ion exchange resins. Although it is preferable to have ion exchange resins of higher crosslinking in order to have higher separation, mixing of uranium isotopes increases with the percentage of crosslinking. Therefore, it is important to control the percentage of crosslinking for preventing mixing of isotopes, e.g. a percentage of crosslinking less than about 50 percent and preferably about 5 to 20 percent, if the ion exchange resin has a high porosity. Crosslinking results from the presence of diene molecules in the material being polymerized, e.g. a monoolefin such as styrene plus a diene such as divinylbenzene. The percent crosslinking as employed hereinabove has reference to the percent by weight of diene in the monomer material being polymerized.

Generally, the ion exchange resin particles are spherical but shapes such as fibers or membranes can be used provided the exchange velocity is fast. The diameter of the fiber or the thickness of the membrane will correspond to the diameter of the sphere for the parameters discussed hereinabove.

The ion exchange groups of cationic resins are sulfonic acid or carboxylic acids while those of anion exchange resins are primary, secondary or tertiary amines and/or quarternary ammonium groups. Amphoteric ion exchange resins having both amine and acid groups can also be utilized, e.g. chelate resins such as $RN(CH_2COONa)_2$ or

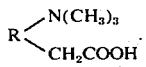

wherein R is an organic group.

As a base polymer for the ion exchange resin, there are preferred copolymers of divinylbenzene with styrene, acrylic or methacrylic acid, an acrylic or methacrylic acid ester, vinylpyridine, and the like.

Preferred cation exchange resins include the sulfonation product of a copolymer of styrene and divinylbenzene, crosslinked polystyrene, copolymer of acrylic or methacrylic acid with divinylbenzene, or the hydrolysis product of the copolymer of an acrylic or methacrylic acid ester with divinylbenzene.

Preferred anion exchange resins are selected from the group consisting of chloromethylated and aminated copolymers of crosslinked polystyrene, copolymer of vinylpyridine and divinylbenzene, or their quarternized ammonium products.

Preferred amphoteric resins are the products of amination and sulfonation of the copolymer of styrene and divinylbenzene, or the product of amination of a copolymer of acrylic or methacrylic acid, or of a copolymer of divinylbenzene with a vinyl compound having sulfonic acid groups. Synthetic or natural zeolites can be utilized, and also other supporting materials such as alumina can be incorporated into the ion exchange resin.

Isotopes or ions containing isotopes can be concentrated or diluted simultaneously be the method of this invention through direct exchange of isotopes, by the direct coordination, or indirect coordination, through other liqands of the ion exchange resins. In any case, the isotope ions are directly or indirectly bonded to the ion exchange group of the ion exchange resin, and are eluted in the direction of the flow of eluant.

Separation using ligand type exchange resins are convenient to separate isotopes of metals such as uranium or non-metals such as boron. Suitable ligands are halogen, especially fluorine compounds, or cyano-containing compounds or ligand of the above-mentioned eluant.

As a typical example of such application, when an anion exchange resin is exchanged by an anion containing ligand, e.g. sulfuric acid, and a solution of a U(IV) isotope compound is utilized, the U(IV) ion exists in the form of a cation in the external liquid phase and is adsorbed as an anion on the anion exchange resin. Thus, a high percentage of separation of isotopes of the U(IV) ion is obtained.

When a third metal or ligand is exchanged by the ion exchange resin and isotopes are coordinated with such metal or ligand, a suitable ion and its concentration are selected depending upon the stability constant. For example, water can be selected as an eluant, by selecting adsorbed metal or ligand for the ion exchange resin. For example, for separating nitrogen isotopes, alkaline earth metals are adsorbed by the cation exchange resin, and aqueous ammonia is supplied and coordinated to the above metal exchange resin. Also, by using a fluorine type anion exchange resin, separation of boron is conducted by elution with water.

Generally speaking, depending upon the bond strength between ion exchange resin and isotope, the kind and concentration of eluant can be adjusted.

It is sometimes advantageous to cover the surface of the ion exchange resin by a high polymer film having the same electric charge as the counter-ion of the ion exchange resin, in order to limit the size of the ions entering the ion exchange resin, to prevent especially large complex ions from entering the ion exchange resin. In such event the separation of isotopes is improved due to the separate distribution of the coordination compound ion through the external liquid and resin phases of the ion exchange resin depending upon the size of the coordination compound ion. In such manner, a relatively low molecular weight polymer having the same charge as the counter-ion of the ion exchange resin may be reacted or adsorbed by the ion exchange resin.

In order to adsorb isotope compound ions, the ion exchange resin is rinsed with an electrolyte solution such as eluant acid, salt or hydroxide. For instance, for adsorption of isotopes by a cation exchange resin the rinse is with an acid or eluant, and by an anion exchange resin the rinse is with hydroxide, base or eluant.

If an eluant rinse is inadequate to adsorb isotope compound ions, the ion exchange resin may be regenerated by other kinds of regenerants for example a cation exchange resin may be regenerated by acid and/or salt solution containing ligand, and an anion exchange resin by base and/or acid or salt solution containing ligand. Then isotopes are adsorbed by the resin and migration is carried out by eluant.

The ion exchange resins generally are filled in a column or tube and utilized for the separation of isotopes. The separation of isotopes is carried out through one or more columns in series. The height of the column depends upon the one stage separation factor or percentage of concentration per unit length of the column. For example, it is necessary to have about 10 to 1,000 meters of distance of advance of U(IV) ion in order to concentrate uranium 235 from 0.0072 percent in natural uranium to 3 percent. The distance for the concentration is determined by one stage separation factor ($\epsilon$) and the cycle of the passage in the same column.

The effluent of one column can be concentrated in a separate column successively in order to increase its concentration. In the event a plurality of bands of isotopes exist in a single column, a single eluant can elute all the bands in series. If the diffusion of the band at its trailing end is aggravated, the end of one band will reach the front of the next band, and separation stops. Therefore, control of band diffusion is important in this process. Gradually, each isotope ion band migrates or advances to the end of the column and is eluted by eluant, leaving the column as effluent.

The concentrated fraction of one isotope, a fraction having the same isotope ratio as the raw material and a fraction diluted in one isotope are classified either into product or waste. If the concentration and dilution of isotopes are not sufficient, effluent from the column is sent to another column and further concentrated. The middle fraction of each band can be added to raw material and recycled for further separation of isotopes.

Diluted isotope solution, concentrated isotope solution or the middle fraction having the same isotope ratio as the raw material can be separately sent to other ion exchange columns having equivalent concentrations of isotopes and further concentration or dilution can be performed in cascade system.

As explained in detail above, the method of isotope separation of this invention is based on the difference in chemical affinity of the isotopes so that the energy consumption is negligible in comparison with other physical methods. Also, the distance of one theoretical plate is considerably small, for example, about less than 10 millimeters, and extensive concentration of one isotope is carried out in a relatively small column. Therefore, if the concentration is carried out in this process, many theoretical plates can be operated without any complicated cascade system in order to have a high concentration of isotopes.

The invention will be further described in the following illustrative examples wherein all parts are by weight unless otherwise expressed.

EXAMPLE 1

A column of 10 cm inner diameter and 10 meter length steel pipe lined with fluorocarbon polymer was filled with a sulfate type anion exchange resin prepared by chloromethylation and amination with trimethylamine of the copolymer of styrene and 6 percent divinylbenzene, the apparent density of the chloride type resin being 0.250 gram dry resin per cc of wet resin. An eluant of 0.40 M ammonium sulfate solution adjusted to pH 1.0 with sulfuric acid was supplied continuously to the top of the column at a flow rate of 2.2 liters/hour at a temperature of 50°C. After 20 hours, the eluant supply to the column was interrupted, and was switched to an acidic ammonium sulfate solution containing 0.01 M U(IV) chloride having a $^{235}U/^{238}U$ isotope ratio of 0.007253 (in molar ratio, the same notation is used hereinafter). 17 liters of said mixed solution of U(IV) chloride and ammonium sulfate was supplied to the column at a flow rate of 2.2 liters/hours, and then flow of the eluant was resumed at the same feed rate. By repeating these operations, alternating bands of U(IV) sulfate complex ion and sulfate ion were formed in the anion-exchange resin column, and all bands advanced in parallel in the flow direction of eluant. At the steady state, five pairs of said bands were formed in the anion-exchange column of 10 m length, and the width of each U(IV) complex ion band at the outlet of the column was about 152 cm, and that of each sulfate ion band was 40 cm. The time required for each band to travel from the top to the bottom of the column was about 154 hours. The effluent of U(IV) complex ion band was collected at the bottom of the column separately as several fractions. 13.6 liters of effluent were collected as a first fraction when each U(IV) complex ion band reached the bottom of the column, the next 25.8 liters as a second fraction, and further 13.6 liters as a third fraction. U(IV) ion concentration and $^{235}U/^{238}U$ isotope ratios were determined for each fraction, a mass-spectroscope being used for isotope ratio determination The concentration of U(IV) ion and $^{235}U/^{238}U$ isotope ratios of said three fractions were, respectively, 0.936 × $10^{-3}$ M and $^{235}U/^{238}U = 0.007983$, 5.58 × $10^{-3}$ M and $^{235}U/^{238}U = 0.007250$ (nearly equal to the feed solution), and 0.968 × $10^{-3}$ M and $^{235}U/^{238}U = 0.006540$. Thus uranium 235 was concentrated by about 10 percent in the frontal part of the effluent of each U(IV) complex ion band.

EXAMPLE 2

A column of 10 cm inner diameter and 10 meter length steel pipe lined with fluorocarbon polymer was filled with a sulfate type anion exchange resin prepared by chloromethylation and amination with dimethylaminoethanol of the copolymer of styrene and 8 percent divinylbenzene, the apparent density of the resin being 0.303 gram dry resin per cc of wet resin. 17.6 liters of a solution containing 0.01 M U(IV) chloride have a $^{235}U/^{238}U$ isotope ratio of 0.007253 were supplied to the top of the column at a flow rate of 2.2 liters/hour. In 7.5 hours, flow of U(IV) chloride solution was interrupted and 1 M hydrogen chloride solution was supplied to the top of the column at the same flow rate at a temperature of 45°C. A single band of U(IV) sulfate complex ion in the anion exchange column advanced in the flow direction of eluant, and the resin was converted to chloride type. Then, 5 M sulfuric acid solution was supplied to the top of the column at a flow rate of 10 liters/hour for about 20 hours so that the resin was regenerated to the sulfate type. These operations were repeated.

When the U(IV) complex ion band eluted by the hydrogen chloride solution reached the outlet of the column, the width of the U(IV) complex ion band was about 46 cm. The time required for the band to travel from the top to the bottom of the column was about 100 hours. The effluent of U(IV) complex ion band was collected at the bottom of the column separately as several fractions. First 2,750 cc of effluent were collected as a first fraction commencing from the time when each U(IV) complex ion band reached the bottom of the column, the next 4,500 cc as a second fraction, and further 2,750 cc as a third fraction. U(IV) ion concentration and $^{235}U/^{238}U$ isotope ratios were analyzed in each fraction, a mass-spectroscope being used for isotope ratio determination.

The concentration U(IV) ion and $^{235}U/^{238}U$ isotope ratios of said three fractions were, respectively, 5.15 × $10^{-3}$ M and $^{235}U/^{238}U=0.007603$, 30.4 × $10^{-3}$ M and $^{235}U/^{238}U=0.007253$ (equal to the feed solution), and 5.21 × $10^{-3}$ M and $^{235}U/^{238}U= 0.006920$. Thus uranium 235 was concentrated by about 4.8 percent in the frontal part of the effluent of each U(IV) complex ion band.

EXAMPLE 3

Example 1 was repeated except that 1.0 M sulfuric acid solution was used for the eluant. Similar concentration of uranium 235 was observed.

EXAMPLE 4

A column of 10 cm inner diameter and 10 meter length steel pipe lined with fluorocarbon polymer was filled with a chloride type anion exchange resin prepared by chloromethylation and amination with trimethylamine of the copolymer of styrene and 12 percent divinylbenzene, the apparent density of the resin being 0.355 gram dry resin per cc of wet resin. An eluant of 8.0 M hydrogen chloride solution was supplied continuously to the top of the column at a flow rate of 4.4 liters/hour at a temperature of 50°C. After 10 hours, the eluant supply to the column was interrupted, and was switched to 8.0 M hydrogen chloride solution containing 0.01 M of U(IV) chloride having a $^{235}U/^{238}U$ isotope ratio of 0.007253. 7.1 liters of the mixed solution of U(IV) chloride and hydrogen chloride were supplied to the column at a flow rate of 4.4 liters/hour, and then flow of the first hydrogen chloride solution without U(IV) chloride was resumed at the same feed rate. By repeating these operations, alternating bands of U(IV) sulfate complex ion and chloride ion were formed in the anion exchange resin column, and all bands advanced in parallel in the direction of flow of eluant hydrogen chloride solution. At the steady state, 17 pairs of said bands were formed in the anion exchange column of 10 m length, and the width of each U(IV) complex ion band at the outlet of the column was about 52 cm, and that of chloride band was about 6.7 cm. The time required for each band to travel from the top to the bottom of the column was about 195 hours.

The effluent of U(IV) complex ion band was collected at the bottom of the column separately as several fractions.

12 liters of effluent were collected as a first fraction from the time when each U(IV) complex ion band reached the bottom of the column, the next 20.5 liters as a second fraction, and further 12 liters as a third fraction. The concentration of U(IV) ion and $^{235}U/^{238}U$ isotope ratios of said three fractions were, respectively, $0.48 \times 10^{-3}$ M and $^{235}U/^{238}U = 0.006756$, $2.91 \times 10^{-3}$ M and $^{235}U/^{238}U=0.007252$ (nearly equal to the feed solution), and $0.46 \times 10^{-3}$ M and $^{235}U/^{238}U=0.007740$. Thus uranium 235 was concentrated by about 6.7 percent in the rear part of the effluent of each U(IV) complex band.

EXAMPLE 5

A column of 10 cm inner diameter and 10 meter length steel pipe lined with fluorocarbon polymer was filled with a sulfate type anion exchange resin prepared by chloromethylation and amination with dimethylaminoethanol of the copolymer of styrene and 15 percent divinylbenzene, the apparent density of the resin in chloride form being 0.310 gram dry resin per cc of wet resin. An eluant of 0.70 M ammonium sulfate solution adjusted to pH 1.0 with sulfuric acid was supplied continuously to the top of the column at a flow rate of 2.2 liters/hour at a temperature of 50°C. After 12 hours, the eluant supply to the column was interrupted, and was switched to an acidic ammonium sulfate solution containing 0.70 M ammonium sulfate and 0.01 M of U(IV) chloride having a $^{235}U/^{238}U$ isotope ratio of 0.007253. 16.5 liters of said mixed solution of U(IV) chloride and ammonium sulfate were supplied a flow rate of 2.2 liters/hour, and then the eluant solution flow was resumed at the same feed rate. By repeating these operations, alternating bands of U(IV) sulfate complex ion and ammonium sulfate ion were formed in the anion-exchange resin column, and all bands moved in parallel in the direction of the flow of ammonium sulfate eluant solution. At the steady state condition, seven pairs of said bands were formed in the anion exchange column of 10 m length, the width of each U(IV) complex ion band at the outlet of the column was about 116 cm and that of the sulfate ion band was 17 cm. The time required for each band to travel from the top to the bottom of the column was about 140 hours. The effluent of U(IV) complex ion band was collected at the bottom of the column separately as several fractions. The first 5.5 liters of effluent were collected as a first fraction when each U(IV) complex band reached the bottom of the column, the next 24 liters as a second fraction, and a further 9 liters as a third fraction. U(IV) ion concentration and $^{235}U/^{238}U$ isotope ratios were analyzed in each fraction, a mass-spectroscope being used for isotope ratio determination.

The concentration of U(IV) ion and $^{235}U/^{238}U$ isotope ratios of said three fractions were, respectively, $0.942 \times 10^{-3}$ M and $^{235}U/^{238}U = 0.008070$, $6.14 \times 10^{-3}$ M and $^{235}U/^{238}U = 0.007255$ (nearly equal to the feed solution), and $0.613 \times 10^{-3}$ M and $^{235}U/^{238}U=0.006500$. Thus uranium 235 was concentrated by about 11 percent in the front part of the effluent of each U(IV) complex band.

EXAMPLE 6

A column of 10 cm inner diameter and 10 meter length steel pipe lined with fluorocarbon polymer was filled with a hydrogen type cation exchange resin prepared by sulfonating the surface of the copolymer of styrene and 10 percent divinylbenzene, the apparent density of the above resin sodium form being 0.260 gram dry resin per cc of wet resin. An eluant of 0.60 M lactic acid and 0.3 M ammonium chloride solution adjusted to pH 1.0 with hydrochloric acid was supplied continuously to the top of the column at a flow rate of 4 liters/hour at a temperature of 30°C. After 10 hours the eluant supply to the column was interrupted, and was switched to lactic acid and ammonium chloride solution containing 0.03 M of U(IV) chloride having a $^{235}U/^{238}U$ isotope ratio of 0.007253, 0.60 M lactic acid and 0.3 M ammonium chloride. 16 liters of the mixed solution of U(IV) chloride, lactic acid and ammonium chloride were supplied to the column at a flow rate of 4 liters/hour, and then flow of the first eluant solution without U(IV) chloride was resumed at the same flow rate. By repeating these operations, alternating bands of U(IV) lactate complex ion and eluant ion were formed in the cationexchange resin column, and all bands advanced in parallel in the flow direction of eluant. At the steady state, six pairs of said bands were formed in the cation exchange column of 10 m length, the width of each U(IV) complex ion band at the outlet of the column was about 120 cm and that of each eluant ion band was 20 cm. The time required for each band to travel from the top to the bottom of the column was about 105 hours. The effluent of U(IV) complex ion band was collected at the bottom of the column separately as several fractions. First 13.0 liters of effluent were collected as a first fraction when each U(IV) complex ion band reached the bottom of the column, the next 23.0 liters as a second fraction, and a further 14.0 liters as a third fraction. U(IV) ion concentration and $^{235}U/^{238}U$ isotope ratios were analyzed in each fraction, a mass-spectroscope being used for isotope ratio determination.

The concentration of U(IV) ion and $^{235}U/^{238}U$ isotope ratios of said three fractions were, respectively, $2.9 \times 10^{-3}$ M and $^{235}U/^{238}U=0.006955$, $16.8 \times 10^{-3}$ M and $^{235}U/^{238}U=0.007256$ (nearly equal to the feed solution), and $2.6 \times 10^{-3}$ M and $^{235}U/^{238}U=0.007556$. Thus uranium 235 was concentrated by about 4.2 percent in the rear part of the effluent of each U(IV) complex ion band.

EXAMPLE 7

A column of 10 cm inner diameter and 10 meter length steel pipe lined with fluorocarbon polymer was filled with a hydrogen type cation exchanger made of glass beads coated to a thickness of 0.15 mm with a sulfonated copolymer of styrene and 12 percent divinylbenzene, the apparent density of the resin in sodium form being 0.250 gram dry resin per cc of wet resin. An eluant of 0.1 M citric acid and 0.45 M ammonium chloride solution adjusted to pH 1.1 with hydrochloric acid was supplied continuously to the top of the column at a flow rate of 6 liters/hour at a temperature of 60°C. After 11.5 hours, the eluant supply to the column was interrupted, and was switched to an acidic solution containing 0.1 M citric acid, 0.45 M ammonium chloride and 0.01 M/l of U(IV) chloride having a $^{235}U/^{238}U$ isotope ratio of 0.007253. 24 liters of the mixed solution of U(IV) chloride, citric acid and ammonium chloride was supplied to the column at 6 liters/hour, and then flow of the first solution of citric acid and ammonium chloride without U(IV) chloride was resumed at the same feed rate. By repeating these operations, alternating bands of U(IV) sulfate complex ion and eluant ion were formed in the cation exchange resin column, and all bands advanced in parallel in the flow direction of eluant solution. The temperature inside the column was maintained at 60°C by a warm water jacket around the column. At the steady state, six pairs of said bands were formed in the cation exchange column of 10 m length, the width of each U(IV) complex ion band at the outlet of the column was about 120 cm, and that of each eluant band was 20 cm. The time required for each band to travel from the top to the bottom of the column was about 110 hours. The effluent of U(IV) complex ion band was collected at the bottom of the column separately as several fractions. 21.0 liters of effluent were collected as a first fraction when each U(IV) complex ion band reached the bottom of the column, the next 37.5 liters as a second fraction, and a further 22.0 liters as a third fraction. U(IV) ion concentration and $^{235}U/^{238}U$ isotope ratios were analyzed in each fraction, a mass-spectroscope being used for isotope ratio determination.

The concentration of U(IV) ion and $^{235}U/^{238}U$ isotope ratios of said three fractions were, respectively, $1.0 \times 10^{-3}$ M and $^{235}U/^{238}U=0.006980$, $5.3 \times 10^{-3}$ M and $^{235}U/^{238}U=0.007250$ (nearly equal to the feed solution), and $0.9 \times 10^{-3}$ M and $^{235}U/^{238}U=0.007590$. Thus uranium 235 was concentrated by about 4.6 percent in the rear part of the effluent of each U(IV) complex ion band.

EXAMPLE 8

A column of 10 cm inner diameter and 10 meter length steel pipe lined with fluorocarbon polymer was filled with a hydrogen cycle cation exchange resin prepared by sulfonating the surface of a copolymer of styrene and 15 percent divinylbenzene, the apparent density of the above resin in sodium form being 0.320 gram dry resin per cc of wet resin. An eluant comprising a solution of 0.40 M sulfosalicyclic acid and 0.4 M ammonium chloride adjusted to pH 1.3 with hydrochloric acid was supplied continuously to the top of the column at a flow rate of 6.0 liters/hour at a temperature of 75°C. After 10 hours, the eluant supply to the column was interrupted, and was switched to an acidic solution containing 0.4 M sulfosalicyclic and 0.01 M of U(IV) chloride having a $^{235}U/^{238}U$ isotope ratio of 0.007253 acid and 0.4 M ammonium chloride. 24 liters of the mixed solution of U(IV) chloride and sulfosalicyclic acid was supplied to the column at a rate of 6.0 liters/hour, and then flow of eluant was resumed at the same feed rate. By repeating these operations, alternating bands of U(IV) complex ion and eluant were formed in the cation exchange resin column, and all bands advanced in parallel in the direction of the flow of eluant. At the steady state, six pairs of said bands were formed in the cation exchange column, the width of each U(IV) complex ion band at the outlet of the column was about 130 cm, and that of each eluant band was 18 cm. The time required for each band to travel from the top to the bottom of the column was about 90 hours. The effluent of U(IV) complex ion band was collected at the bottom of the column separately as several fractions. First 20.0 liters of effluent were collected as a first fraction when each U(IV) complex ion band reached the bottom of the column, the next 34.0 liters as a second fraction, and further 19.0 liters as a third fraction. U(IV) ion concentration and $^{235}U/^{238}U$ were analyzed in each fraction, a mass-spectroscope being used for isotope ratio determination.

The concentration of U(IV) ion and $^{235}U/^{238}U$ isotope ratios of said three fractions were, respectively, $0.99 \times 10^{-3}$ M and $^{235}U/^{238}U=0.006875$, $5.9 \times 10^{-3}$ M and $^{235}U/^{238}U=0.007248$ (nearly equal to the feed solution), and $0.95 \times 10^{-3}$ M and $^{235}U/^{238}U=0.007625$. Thus uranium 235 was concentrated by about 5.1 percent in the rear part of the effluent of each U(IV) complex ion band.

EXAMPLE 9

A column of 10 cm inner diameter and 10 meter length steel pipe lined with fluorocarbon polymer was filled with chloride type anion exchange resin prepared by treating a copolymer of 4-vinyl-pyridine and 6 percent divinylbenzene with methyl iodide, the apparent density of the above resin in chloride form being 0.310 gram dry resin per cc of wet resin. An eluant comprising 0.1 M oxalic acid and 0.6 M ammonium chloride aqueous solution adjusted to pH 2.5 with ammonium hydroxide was supplied continuously to the top of the column at a flow rate of 6 liters/hour at a temperature of 60°C. After 15.7 hours, the eluant supply to the column was interrupted, and was switched to an acidic solution mixture of oxalic acid containing 0.1 M oxalic acid, 0.6 M ammonium chloride and 0.01 M of U(IV) chloride having a $^{235}U/^{238}U$ isotope ratio of 0.007253. 25.8 liters of the mixed solution of U(IV) chloride, oxalic acid and ammonium sulfate were supplied to the column at 6 liters/hour, and then the flow of eluant was resumed at the same feed rate. By repeating these operations, alternating bands of U(IV) oxalate complex ion and eluant ion were formed in the anion exchange resin column, and all bands advanced in parallel in the direction of the flow of eluant solution. At the steady state, six pairs of said bands were formed in the anion exchange column of 10 m length, the width of each U(IV) complex ion band at the outlet of the column was about 138 cm, and that of each eluant ion band was 20 cm. The time required for each band to travel from the top to the bottom of the column was about 123 hours. The effluent of U(IV) complex ion band was collected at the bottom of the column separately as several fractions. First 26 liters of effluent were collected as a first fraction when each U(IV) complex ion band reached the bottom of the column, the next 48 liters as a second fraction, and a further 30 liters as a third fraction. U(IV) ion concentration and $^{235}U/^{238}U$ isotope ratios were analyzed in each fraction, a mass-spectroscope being used for isotope ratio determination.

The concentration of U(IV) ion and $^{235}U/^{238}U$ isotope ratios of said three fractions were, respectively, $0.8 \times 10^{-3}$ M and $^{235}U/^{238}U=0.007610$, $4.5 \times 10^{-3}$ M and $^{235}U/^{238}U=0.007250$ (nearly equal to the feed solution), and $0.7 \times 10^{-3}$ M and $^{235}U/^{238}U= 0.006900$. Thus uranium 235 was concentrated by about 4.9 percent in the frontal part of the effluent of each U(IV) complex ion band.

EXAMPLE 10

A column of 10 cm inner diameter and 10 meter length steel pipe lined with fluorocarbon polymer was filled with chloride type anion exchange resin prepared by chloromethylation and amination with trimethylamine of the copolymer of styrene and 20 percent divinylbenzene, the apparent density of the above chloride type resin being 0.280 gram dry resin per cc of wet resin. An eluant comprising a mixed solution of 0.1 M ammonium ethylenediamine tetra-acetate and 0.2 M ammonium chloride adjusted to pH 5.5 with hydrochloric acid or aqueous ammonia solution, was supplied continuously to the top of the column at a flow rate of 4 liters/hour at a temperature of 60°C. After 7.5 hours, the eluant supply to the column was interrupted, and was switched to an acidic solution containing 0.1 M ammonium ethylene-diaminetetra acetate, 0.2 M ammonium chloride and 0.01 M of U(IV) chloride having a $^{235}U/^{238}U$ isotope ratio of 0.007253. 5.2 liters of the mixed solution of U(IV) chloride, EDTA and ammonium chloride were supplied to the column at a flow rate of 4 liters/hour, and then flow of eluant was resumed at the same flow rate. By repeating these operations, alternating bands of U(IV) EDTA complex ion and eluant ion were formed in the anion exchange resin column, and all bands advanced in parallel in the direction of the flow of eluant. At the steady state, seven pairs of said bands were formed in the anion exchange column of 10 m length, the width of each U(IV) complex ion band at the outlet of the column was about 120 cm, and that of eluant ion band was 20 cm. The time required for each band to travel from the top to the bottom of the column was about 63 hours. The effluent of U(IV) complex ion band was collected at the bottom of the column separately as several fractions. 7 liters of effluent were collected as a first fraction when each U(IV) complex band reached the bottom of the column, the next 14 liters as a second fraction, and further 9 liters as a third fraction. U(IV) ion concentration and $^{235}U/^{238}U$ isotope ratios were analyzed in each fraction, a mass-spectroscope being used for isotope ratio determination.

The concentration of U(IV) ion and $^{235}U/^{238}U$ isotope ratios of said three fractions were, respectively, $0.60 \times 10^{-3}$ M and $^{235}U/^{238}U=0.007410$, $3.0 \times 10^{-3}$ M and $^{235}U/^{238}U=0.007249$ (nearly equal to the feed solution), and $0.46 \times 10^{-3}$ M and $^{235}U/^{238}U= 0.007095$. Thus uranium 235 was concentrated by about 2.2 percent in the front part of the effluent of each U(IV) complex ion band.

EXAMPLE 11

A column of 10 cm inner diameter and 5 meter length steel pipe lined with fluorocarbon polymer was filled with magnesium type cation exchange resin prepared by sulfonating the surface of copolymer of sytrene and 8 percent divinylbenzene, the apparent density of the resin in sodium form being 0.250 gram dry resin per cc of wet resin. Water was supplied continuously to the top of the column at a flow rate of 3.0 liters/hours. After 2 hours, water supply to the column was interrupted, and was switched to a solution of 0.0723 M ammonium hydroxide having an isotope ration $^{15}N/^{14}N$ of 0.00352. 5 liters of the aqueous ammonia solution were supplied to the column at a flow rate of 3.0 liters/hour, and then the water supply was resumed at the same flow rate. By repeating these operations, alternating bands of ammonium ion and magnesium ion were formed in the cation exchange resin column, and all bands advanced in parallel in the direction of water flow. At the steady state, nine pairs of said bands were formed in the cation exchange column of 5 m length, the width of each ammonium ion band at the outlet of the column was about 37 cm, and that of magnesium was 17 cm. The time required for each band to travel from the top to the bottom of the column was about 56 hours. The effluent of aqueous ammonia was collected at the bottom of the column separately as several fractions. The first 2,380 cc of effluent were collected as a first fraction when each ammonia complex band reached the bottom of the column, the next 4,240 cc as a second fraction, and further 2,380 cc as a third fraction. Ammonium ion concentration and $^{15}N/^{14}N$ isotope ratios of said three fractions were, respectively, 0.012 M and $^{15}N/^{14}N=0.00116$, 0.072 M and $^{15}N/^{14}N=0.00353$ (nearly equal to the feed solution), and 0.012 M and $^{15}N/^{14}N=0.01067$. Thus nitrogen 15 was tripled in the rear part of the effluent of each ammonium ion band.

EXAMPLE 12

A column of 10 cm inner diameter and 10 meter length steel pipe lined with fluorocarbon polymer was filled with a sodium type cation exchange resin prepared by sulfonating the surface of a copolymer of styrene and 20 percent divinylbenzene, the apparent density of the above sodium type resin being 0.340 gram dry resin per cc of wet resin. An eluant comprising a mixture of 0.15 M sodium sulfate, 0.20 M sodium chloride and 0.28 M hydrochloric acid was supplied continuously to the top of the column at a flow rate of 2.0 liters/hour at a temperature of 40°C. After 5 hours, eluant supply to the column was interrupted, and was switched to an acidic solution containing 0.20 M sodium chloride, 0.28 M hydrochloric acid and 0.01 M of U(IV) chloride having a $^{235}U/^{238}U$ isotope ratio of 0.007253. 5 liters of the mixed solution of U(IV) chloride was supplied to the column at a flow rate of 2.0 liters/hour, and then flow of the first eluant was resumed at the same feed rate. By repeating these operations, alternating bands of U(IV) sulfate complex ion and eluant ion were formed in the cation exchange resin column, and all bands advanced in parallel in the direction of eluant flow. At the steady state eleven pairs of said bands were formed in the cation exchange column of 10 m length, the width of each U(IV) complex ion band at the outlet of the column was about 75 cm, and that of the eluant ion band was 15 cm. The time required for each band to travel from the top to the bottom of the column was about 83 hours. The effluent of U(IV) complex ion band was collected at the bottom of the column separately as several fractions. 3.5 liters of effluent were collected as a first fraction when each U(IV) complex ion band reached the bottom of the column, the next 5.5 liters as a second fraction, and further 3.5 liters as a third fraction. U(IV) ion concentration and $^{235}U/^{238}U$ isotope ratios were analyzed in each fraction, a mass-spectroscope being used for isotope ratio determination.

The concentration of U(IV) ion and $^{235}U/^{238}U$ isotope ratios of said three fractions were respectively, 1.2 × $10^{116\ 3}$ and $^{235}U/^{238}U$=0.006991, 7.5 × $10^{-3}$ M and $^{235}U/^{238}U$= 0.007252 (nearly equal to the feed solution), and 1.3 × $10^{-3}$ M and $^{235}U/^{238}U$= 0.007491. Thus uranium 235 was concentrated by about 3.3 percent in the rear part of the effluent of each U(IV) complex EXAMPLE 13

A column of 10 cm inner diameter and 4 meter length steel pipe lined with fluorocarbon polymer was filled with a hydrogen type cation exchange resin prepared by sulfonation of the copolymer of styrene and 10 percent divinylbenzene, the apparent density of the resin in sodium form being 0.440 gram dry resin per cc of wet resin. An eluant containing 0.040 M sodium fluoride, 0.200 M sodium chloride and 0.270 M hydrochloric acid was supplied continuously to the top of the column at a flow rate of 2.0 liters/hour. After 7 hours the eluant supply to the column was interrupted, and was switched to an acidic solution containing 0.040 M sodium fluoride, 0.2 M sodium chloride, 0.27 M hydrochloric acid and 0.010 M of U(IV) chloride having a $^{235}U/^{238}U$ isotope ratio of 0.007253. 4 liters of the mixed solution containing the U(IV) chloride was supplied to the column at a flow rate of 2.0 liters/hour at a temperature of 30°C, and then the flow of the first eluant was resumed at the same flow rate. By repeating these operations, alternating bands of U(IV) fluoride complex ion and eluant were formed in the cation exchange resin column, and all bands advanced in parallel in the direction of eluant. At the steady state, five pairs of said bands were formed in the cation exchange column of 4 m length, the width of each U(IV) complex ion band at the outlet of the column was about 67 cm, and that of eluant was 13 cm. The time required for each band to travel from the top to the bottom of the column was about 45 hours. The effluent of U(IV) complex ion band was collected at the bottom of the column separately as several fractions. The first 2.0 liters of effluent were collected as the first fraction when each U(IV) complex band reached the bottom of the column, the next 3.6 liters as a second fraction, and further 2.0 liters as a third fraction. U(IV) ion concentration and $^{235}U/^{238}U$ isotope ratios were analyzed in each fraction, a mass-spectroscope being used for isotope ratio determination.

The concentration of U(IV) ion and $^{235}U/^{238}U$ isotope ratios of said three fractions were respectively, 1.8 × $10^{-3}$ and $^{235}U/^{238}U$= 0.007187, 9.1 × $10^{-3}$ M and $^{235}U/^{238}U$= 0.007252 (nearly equal to the feed solution), and 1.7 × $10^{-3}$ M and $^{235}U/^{238}U$=0.007331. Thus uranium 235 was concentrated by about 1.1 percent in the rear part of the effluent of each U(IV) complex ion band.

EXAMPLE 14

A column of 10 cm inner diameter and 10 meter length steel pipe lined with fluorocarbon polymer was filled with a hydrogen type cation exchange resin prepared by sulfonation of styrene and 16 percent divinylbenzene copolymer, the apparent density of the above resin in sodium form being 0.400 gram dry resin per cc of wet resin. An eluant of 0.18 M sulfuric acid was supplied continuously to the top of the column at a flow rate of 2.0 liters/hour. After 6 hours the eluant supply to the column was interrupted, and was switched to an acidic solution containing 0.18 M sulfuric acid and 0.01 M U(IV) chloride having a $^{235}U/^{238}U$ isotope ratio of 0.007253. 6 liters of the mixed solution of U(IV) chloride and sulfuric acid were supplied to the column at a flow rate of 2.0 liters/hours at a temperature of 35°C and then eluant flow was resumed at the same flow rate. By repeating these operations, alternating bands of U(IV) sulfate complex ion and eluant ion were formed in the cationexchange resin column, and all bands advanced in parallel in the direction of flow of eluant. At the steady state, eleven pairs of said bands were formed in the cation exchange column of 10 m length, the width of each U(IV) complex ion band at the outlet of the column was about 71 cm, and that of the eluant ion band was about 20 cm. The time required for each band to travel from the top to the bottom of the column was about 101 hours. The effluent of U(IV) complex band was collected at the bottom of the column separately as several fractions. First 3.8 liters of effluent were collected as a first fraction when each U(IV) complex ion band reached the bottom of the column, the next 6.6 liters as a second fraction, and further 3.9 liters as a third fraction. U(IV) ion concentration and $^{235}U/^{238}U$ isotope ratios were analyzed in each fraction, a mass-spectroscope being used for isotope ratio determination.

The concentration of U(IV) ion and $^{235}U/^{238}U$ isotope ratios of said three fractions were, respectively, 1.1 × $10^{-3}$ M and $^{235}U/^{238}U$=0.007100, 7.4 × $10^{-3}$M and $^{235}U/^{238}U$= 0.007252 (nearly equal to the feed solution), and 1.2 × $10^{-3}$ M and $^{235}U/^{238}U$ = 0.007400. Thus uranium 235 was concentrated by about 2.0 percent in the rear part of the effluent of each U(IV) complex ion band.

EXAMPLE 15

An eluant of 0.20 sodium sulfate and 0.28 M hydrochloric acid was supplied continuously to the top of the same cation exchange column as described in Example 14 at a flow rate of 2.0 liters/hour. After 5.5 hours the eluant supply to the column was interrupted, and was switched to an acidic solution containing 0.2 M sodium sulfate and 0.28 M hydrochloric acid and 0.01 M of U(IV) chloride having a $^{235}U/^{238}U$ isotope ratio of 0.007253. 6 liters of the mixed solution of U(IV) chloride and sodium sulfate were supplied to the column at a flow rate of 2.0 liters/hour at a temperature of 30°C, and then the eluant flow was resumed at the same rate. By repeating these operations, alternating bands of U(IV) sulfate complex ion and eluant ion were formed in the cation-exchange resin column, and all bands advanced in paralled in the direction of the flow of eluant. At the steady state, nine pairs of above bands were formed in the cation exchange column of 10 m length, the width of each U(IV) complex ion band at the outlet of the column was about 88 cm, and that of eluant band was 17 cm. The time required for each band to travel from the top to the bottom of the column was about 81 hours. The effluent of U(IV) complex ion band was collected at the bottom of the column separately as several fractions. 3.8 liters of effluent were collected as a first fraction when each U(IV) complex band reached the bottom of the column, the next 6.7 liters as a second fraction, and further 3.8 liters as a third fraction. U(IV) ion concentration and $^{235}U/^{238}U$ isotope ratios were analyzed in each fraction, a mass-spectroscope being used for isotope ratio determination.

The concentration of U(IV) ion and $^{235}U/^{238}U$ isotope ratios of said three fractions were, respectively, $1.1 \times 10^{-3}$ M and $^{235}U/^{238}U=0.007041$, $7.3 \times 10^{-3}$M and $^{235}U/^{238}U=0.007250$ (nearly equal to the feed solution), and $1.3 \times 10^{-3}$M and $^{235}U/^{238}U=0.007461$. Thus uranium 235 was concentrated by about 2.9 percent in the rear part of the effluent of each U(IV) complex ion band.

EXAMPLE 16

A column of 10 cm inner diameter and 45 cm length steel pipe lined with fluorocarbon polymer was filled with fluoride type strongly basic anion exchange resin prepared by chloromethylation and amination of styrene and divinylbenzene copolymer. An aqueous solution of 0.10 M boric acid adjusted to pH 5.0 with hydrochloric acid was prepared and 4.709 liters of the solution were supplied to the top of the column at a flow rate of 1.5 liters/hour. Thus a borate band was formed at the top of the anion-exchange resin column. The $^{10}B/^{11}B$ isotope ratio of the boric acid was 0.2469.

Water was supplied to the column as eluant at a flow rate of 1.5 liters/hour. The boric acid band advanced through the resin column downwardly as water was supplied to the column. The boric acid band reached the bottom of the column 5.33 hours after the initiation of water supply. The effluent of boric acid band was collected at the bottom of the column separately as several fractions. The first 7.5 liters of effluent were collected as a first fraction when the boric acid band reached the bottom of the column, the next 1.5 liters as a second fraction, and further 6.0 liters as as third fraction. Boric ion concentration and $^{10}B/^{11}B$ isotope ratios were analyzed in each fraction, a mass-spectroscope being use for isotope ratio determination.

The concentration of boric ion and $^{10}B/^{11}B$ isotope ratios of said three fractions were, respectively, $29.5 \times 10^{-3}$ M and $^{10}B/^{11}B= 0.2351$, $65.2 \times 10^{-3}$M and $^{10}B/^{11}B=0.2469$ (equal to the feed solution), and $25.3 \times 10^{-3}$M and $10_B/11_B= 0.2673$. Thus boron 10 was concentrated by about 6.51 percent in the rear part of the effluent of the boric acid band.

EXAMPLE 17

A column of 10 cm inner diameter and 45 cm length steel pipe lined with fluorocarbon polymer was filled with a fluoride type strongly basic anion exchange resin prepared by chloromethylation and amination of the copolymer of styrene and divinylbenzene. An aqueous boric acid solution, 0.1 M adjusted to pH 3.0, with hydrochloric acid was prepared and 4.709 liters of the solution were supplied to the top of the column at a flow rate of 1.5 liters/hour. Thus, a borate band was formed at the top of the anion exchange resin column. The $^{10}B/^{11}B$ isotope ratio was 0.2469. Hydrochloric acid solution of pH 2.0 was supplied continuously to the column as eluant at a rate of 1.5 liters/hour, after the boric acid supply was finished, and the boric acid band advanced downwardly in the resin column. The boric acid band reached the bottom of the column 1.78 hours after the initiation of eluant supply. The effluent of borate ion band was collected at the bottom of the column separately as several fractions. First 2.5 liters of effluent were collected as a first fraction when the boric acid band reached the bottom of the column, the next 0.5 liter as a second fraction, and further 2.0 liters as a third fraction. Boric ion concentration and $^{10}B/^{11}B$ isotope ratios were analyzed in each fraction, a mass-spectroscope being used for isotope ratio determination.

The concentration of boric ion and $^{10}B/^{11}B$ isotope ratios of said three fractions were, respectively, $68.5 \times 10^{-3}$ M and $^{10}B/^{11}B=0.2350$, $196 \times 10^{-3}$ M and $^{10}B/^{11}B$ nearly equal to the feed solution, and $76 \times 10^{-3}$ M and $^{10}B/^{11}B= 0.2675$. Thus boron 10 was concentrated by about 6 percent in the rear part of the effluent of the boric acid band.

EXAMPLE 18

A column of 15 cm inner diameter and 4 meter length steel pipe lined with fluorocarbon polymer was filled with a hydrogen type cation exchange resin made of surface-sulfonated styrenedivinylbenzene copolymer. An eluant of 0.01 M sodium fluoride and 0.5 M sulfuric acid was supplied continuously to the top of the column at a flow rate of 4.5 liters/hour. After 54 hours the eluant supply to the column was interrupted and was switched to an acidic solution containing 0.5 M sulfuric acid and 0.1 M U(IV) sulfate having a $^{235}U/^{238}U$ isotope ratio of 0.00728. 18 liters of the acidic solution of U(IV) sulfate and sodium fluoride was supplied to the column at a rate of 4.5 liters/hour, and then flow of the eluant was resumed at the same rate. By repeating these operations, alterating bands of U(IV) sulfate complex ion and eluant were formed in the cation exchange resin column, and all bands advanced in parallel in the direction of eluant solution. At the steady state, two pairs of bands were formed in the cation exchange column of 4 m length, the width of each U(IV) complex ion band at the outlet of the column was about 166 cm, and that of eluant was 14 cm. The time required for each band to travel from the top to the bottom of the column was about 120 hours. The effluent of U(IV) complex ion band was collected at the bottom of the column separately as several fractions. First 45 liters of effluent were collected as a first fraction when each U(IV) complex band reached the bottom of the column, the next 67.5 liters as a second fraction, and further 112.5 liters as a third fraction. U(IV) ion concentration and $^{235}U/^{238}U$. were analyzed in each fraction, a mass-spectroscope being used for isotope ratio determination.

The U(IV) in concentration and $^{235}U/^{238}U$ isotope ratios of said three fractions were, respectively, $9.1 \times 10^{-3}$ M and $^{235}U/^{238}U=0.00722$, $12.5 \times 10^{-3}$ M and $^{235}U/^{238}U=0.00727$ (nearly equal to the feed solution), and $4.9 \times 10^{-3}$ M and $^{235}U/^{238}U=0.00736$. Thus uranium 235 was concentrated by about 1.1 percent in the rear part of the effluent of each U(IV) complex ion band.

EXAMPLE 19

A column of 15 cm inner diameter and 10 meter length steel pipe lined with fluorocarbon polymer was filled with chloride type anion exchange resin of 100 to 200 mesh, prepared by chloromethylation and amination with trimethylamine of a styrene and divinylbenzene copolymer. An eluant of 6.0 M hydrochloric acid and 0.01 M sodium fluoride was supplied continuously to the top of the column at a flow rate of 4.5 liters/hour. After 3.2 hours eluant supply to the column was interrupted and was switched to 6.0 M hydrochloric acid solution containing 0.1 M of U(IV) chloride having a $^{235}U/^{238}U$ isotope ratio of 0.00728. 4.275 liters of the mixed solution of U(IV) chloride and hydrochloric acid were supplied to the column, and then the flow of eluant was resumed at the same feed rate. By repeating these operations, alternating bands of U(IV) complex ion and eluant were formed in the anion exchange resin column, and all bands advanced in parallel in the direction of the flow of eluant. At the steady state, eleven pairs of said bands were formed in the anion exchange column of 10 m length, the width of each U(IV) complex ion band at the outlet of the column was about 69 cm, and that of eluant was 11 cm. The time required for each band to travel from the top to the bottom of the column was about 40 hours. The effluent of U(IV) complex ion band was collected at the bottom of the column separately as several fractions. 4.5 liters of effluent were collected as a first fraction when each U(IV) complex ion band reached the bottom of the column, the next 6.75 liters as a second fraction, and further 2.25 liters as a third fraction. U(IV) ion concentration and $^{235}U/^{238}U$ isotope ratios were analyzed in each fraction, a mass-spectroscope being used for isotope ratio determination The concentration of U(IV) ion and $^{235}U/^{238}U$ isotope ratios of said three fractions were, respectively, $19 \times 10^{-3}$ M and $^{235}U/^{238}U=0.00744$, $48.5 \times 10^{-3}$M and $^{235}U/^{238}U=0.00726$ (nearly equal to the feed solution), and $6.4 \times 10^{-3}$ M and $^{235}U/^{238}V=0.00724$. Thus uranium 235 was concentrated by about 2.2 percent in the front part of the effluent of each U(IV) complex band.

EXAMPLE 20

A column of 10 cm inner diameter and 100 cm length steel pipe lined with fluorocarbon polymer was filled with cation exchange resin prepared by sulfonation of the copolymer of styrene and 6 percent divinylbenzene. An eluant of 0.20 M sodium fluoride was supplied continuously to the top of the column at a flow rate of 2.0 liters/hour. After 6 hours eluant supply to the column was interrupted, and was switched to 1 M lithium fluoride solution having a $^6Li/^7Li$ isotope ratio of 8.1023. 1,647 cc of the lithium fluoride solution were supplied to the column, and then the eluant flow was resumed at the same feed rate. By repeating these operations, alternating bands of lithium and sodium were formed in the cation exchange resin column, and all bands advanced in parallel in the direction of the flow of eluant. The time required for each band to travel from the top to the bottom of the column was about 15 hours. The effluent of lithium band was collected at the bottom of the column separately as several fractions. The first 3 liters of effluent were collected as a first fraction when each lithium band reached the bottom of the column, the next 4 liters as a second fraction, and further 3 liters as a third fraction. Lithium ion cconcentration and $^6Li/^7Li$ isotope ratios were analyzed in each fraction, a mass-spectroscope being used for isotope ratio determination.

The concentration of lithium and $^6Li/^7Li$ isotope ratios of said three fractions were, respectively, 0.0747 M and $^6Li/^7Li=7.8234$, 0.2123 M and $^6Li/^7Li=8.1023$, 0.1170 and $^6Li/^7Li=8.4515$.

EXAMPLE 21

A column of 4.5 cm inner diameter and 3 meter length steel pipe lined with fluorocarbon polymer was filled with an ammonium type cation exhange resin prepared by sulfonating the surface of a copolymer of styrene and 8 percent divinylbenzene, the apparent density of the resin in sodium form being 0.350 gram dry resin per cc of wet resin. A nickel nitrate solution with ammonium ion was supplied to the top of the column to form a nickel ammonium complex band containing 45.2g as nickel. Then, 0.2 M ammonium cyanide solution with a small amount of excess ammonium ion was supplied to the column for 62 hours at a flow rate of 250 cc/hour. After interrupting the feed of ammonium cyanide, flow of the first nickel nitrate solution with excess ammonium ion was resumed. By repeating these operations, alternating bands of nickel ammonium complex about 75 cm wide, and of ammonium ion about 20 cm wide, were formed in the cation exchange resin column, and all bands advanced downwardly in the flow direction of eluant. The effluent of nickel ammonium complex band was collected at the bottom of the column separately as several fractions. Nickel ion concentration and $^{58}Ni/^{64}Ni$ isotope ratios were analyzed in each fraction.

Nickel 64 was concentrated in the front part of each nickel complex ion band, and nickel 58 in the rear. Thus, in the rear part of the first, second and third bands, 3.4g 3.3g and 3.5g of nickel with an isotope ratio of $^{58}Ni/^{64}Ni_=91.0$ were obtained. In the front part of each band, 30.0g, 29.2g and 30.1g of nickel with an isotope ratio of $^{58}Ni/^{64}Ni_=58.5$ were obtained. The isotope ratio $^{58}Ni/^{64}Ni$ of the feed nickel nitrate solution was 65.3.

EXAMPLE 22

A column of 4.5 cm inner diameter and 3 meter length steel pipe lined with fluorocarbon polymer was filled with a nitrate type anion exchange resin prepared by chloromethylation and amination of a copolymer of styrene and divinylbenzene. A solution of 0.02 M nickel nitrate and 0.15 M sodium cyanide was supplied continuously to the top of the column at a flow rate of 250 cc/hour. After 10 liters of the 0.02 M nickel nitrate and 0.15 M sodium cyanide solution were supplied, 10 liters of eluant of 0.15 M sodium nitrate were supplied at 250 cc/hour.

By repeating these operations, alternating bands of 100 cm nickel cyanide complex and 100 cm nitrate ion were formed in the anion exchange resin column, and all bands advanced in parallel in the direction of the flow of the eluant. The effluent of nickel complex band was collected at the bottom of the column separately as several fractions. Cyanide ion concentration and isotope ratios $^{13}C/^{12}C$ and $^{15}N/^{14}N$ were analyzed in each fraction.

Light isotopes, carbon 12 and nitrogen 14, were concentrated in the frontal part of the effluent of each nickel cyanide complex ion band, and heavy isotopes, carbon 13 and nitrogen 15 in the rear. Thus, about 5 grams of carbon, having the isotope ratio $^{13}C/^{12}C$ of 0.0140, and about 6 grams of nitrogen having the isotope ratio $^{15}N/^{14}N$ of 0.00477, were obtained in the rear part of the effluent of the first band. The isotope ratios $^{13}C/^{12}C$ and $^{15}N/^{14}N$ in feed cyanide solution were 0.0112 and 0.00367 respectively.

EXAMPLE 23

A column of 10 cm inner diameter and 10 meter length steel pipe lined with fluorocarbon polymer was filled with hydrogen type cation exchange resin made of sulfonated styrene and divinylbenzene copolymer. An eluant of 2.0 M uranyl sulfate solution was supplied to the top of the column at a flow rate of 2.0 liters/hour. After 0.5 hour the eluant supply to the column was interrupted, and was switched to 0.47 M U(IV) sulfate solution having a $^{235}U/^{238}U$ isotope ratio of 0.00728. 4 liters of the solution of U(IV) sulfate was supplied to the column at a rate of 2.0 liters/hour, and then flow of the eluant was resumed at the same rate. By repeating these operations, alternating bands of U(IV) sulfate complex ion and uranyl sulfate complex were formed in the cation exchange resin column, and all bands advanced in parallel in the direction of flow of eluant. At the steady state, 10 pairs of said bands were formed in the cation exchange column of 10 m length, and the width of a pair of U(IV) and uranyl complex bands at the outlet of the column was about 80 cm. The time required for each band to travel from the top to the bottom of the column was about 35 hours. The effluent of U(IV) complex band was collected at the bottom of the column separately as several fractions. 1.5 liters of effluent were collected as a first fraction when each U(IV) complex band reached the bottom of the column, the next 2.0 liters as a second fraction, and further 1.5 liters as a third fraction. U(IV) ion oncentration and $^{235}U/^{238}U$ isotope ratios were analyzed in each fraction, a mass-spectroscope being used for isotope ratio determination.

The concentration of U(IV) ion and $^{235}U/^{238}U$ isotope ratios of said three fractions were, respectively, 0.33 M and $^{235}U/^{238}U=0.00720$, 0.47 M and $^{235}U/^{238}U=0.00727$ (nearly equal to the feed solution), and 0.29 M and $^{235}U/^{238}U=0.00740$. Thus uranium 235 was concentrated by about 1.5 percent in the rear part of the effluent of each U(IV) complex band.

It will be appreciated that the instant specification and examples are set forth by way of illustration and not limitation, and that various modifications and changes may be made without departing from the spirit and scope of the present invention.

What we claim is:

1. Method of simultaneously obtaining separate enriched fractions of heavier and lighter isotopes from isotopic mixtures thereof, which comprises establishing a liquid body containing a mixture in which the isotopes are in the form of coordination complexes of a metal with a ligand, said complexes being present in a plurality of different valent states, alternately passing through a highly cross-linked porous ion exchange resin said body and then an eluant but not a regenerant, thereby forming a plurality of spaced apart isotope-containing bands each about 2 to 1000 cm in width, and as each isotope-containing band leaves the resin collecting it in at least three fractions, the intermediate fraction having approximately the isotope composition of the starting liquid body, and one of the first and last fractions being selectively enriched in the heavier isotope and the other being selectively enriched in the lighter isotope.

2. Method according to claim 1, in which said isotope is selected from the group consisting of metals which after forming said coordination complexes have a rare gas structure and a valence of at least 2, and transition metals having electron vacancies in the d-sub shell or outer shell.

3. Method according to claim 1, wherein said metal of said coordination complex is present in only one valence state, the ligand providing for the plurality of different valent states of said complexes.

4. Method according to claim 1, in which said isotopes constitute a part of said ligand which is in a coordination complex with said metal.

5. Method according to claim 1, in which said coordination complex is formed in situ with ligands obtained from at least one of said eluant and adsorbate on said ion exchange resin.

6. Method according to claim 5, in which said ion exchange resin is equilibrated with the ligand solution and in which said eluant is an electrolyte solution formed from an electrolyte different from said ligand complex.

7. Method according to claim 4, in which said eluant is passed through said column at a substantially higher flow velocity than the flow velocity of the bands of said isotope-containing coordination complex.

8. Method according to claim 1, in which said ion exchange resin is equilibrated with the ligand solution and in which said eluant is an electrolyte solution containing not more than a minor molar percentage of said ligand.

9. Method according to claim 1, in which said eluant comprises an electrolyte solution of a compound of said ligand.

10. Method according to claim 1, in which said ion exchange resin is an anion exchange resin and in which said eluant is water.

11. Method according to claim 1, in which said ligand comprises a sulfuric acid group and in which said ion exchange resin is a cation exchange resin.

12. Method according to claim 1, in which said ion exchange resin has a member selected from the group consisting of sulfonic acid and carboxylic acid ion exchange groups.

13. Method according to claim 1, in which said isotope is selected from the group consisting of lithium, boron, carbon, nitrogen, nickel, oxygen, sulfur and phosphorus.

14. Method according to claim 1, in which the eluaant comprises a solution of a mineral acid, an organic acid, a salt or an electrolyte.

15. Method according to claim 1, in which a plurality of successive ion exchange columns are provided, a middle fraction of the effluent also being collected, at least one of the enriched or depleted fractions being advanced to a subsequent ion exchange column and the middle fraction being recycled as feed to an ion exchange column whose feed has substantially the same isotope ratio.

16. Method according to claim 1, in which said ion exchange resin is enclosed by a high polymer film having the same charge as the ion exchange group of the resin.

17. Method according to claim 1, in which the ion exchange groups of the resin are no more than about 0.15 mm from the surface of the resin, the groups being present to the extent of about 1 to 10 milliequivalents per gram of dry resin in the portion carrying such groups.

18. Method according to claim 17, in which the resin comprises a copolymer of a monoolefin and a diolefin, the diolefin constituting about 5 to 50 percent of the copolymer, said copolymer having been aftertreated to provide ion exchange groups thereon.

* * * * *